United States Patent [19]

Riley

[11] Patent Number: 4,486,180
[45] Date of Patent: Dec. 4, 1984

[54] TESTING SYSTEM WITH TEST OF SUBJECT MATTERS, IDENTIFICATION AND SECURITY

[76] Inventor: Michael D. Riley, c/o Cunningham & Walsh, Inc., 500 Sansome St., San Francisco, Calif. 94111

[21] Appl. No.: 372,114

[22] Filed: Apr. 27, 1982

[51] Int. Cl.³ .............................................. G09B 9/04
[52] U.S. Cl. ...................................... 434/65; 434/69; 434/155; 434/323; 434/432
[58] Field of Search ................................. 434/62–65, 434/69, 71, 322, 323, 154–157, 236, 350, 361, 363, 365, 432, 185, 306, 307; 118/31.5; 179/1 VC, 1 SA, 1 SB; 381/42

[56] References Cited

U.S. PATENT DOCUMENTS

| | | | |
|---|---|---|---|
| 2,627,125 | 2/1953 | Finegan | 434/306 |
| 2,870,548 | 1/1959 | Chedister | 434/71 |
| 3,673,331 | 6/1972 | Hair et al. | 179/1 SB |
| 3,694,240 | 9/1972 | Miller et al. | 118/31.5 |
| 4,048,729 | 9/1977 | Derks | 434/320 |
| 4,057,911 | 11/1977 | Sack | 434/64 |
| 4,170,832 | 10/1979 | Zimmerman | 434/323 |

OTHER PUBLICATIONS

*Teacher's Manual for Sportsmanlike Driving*, Amer. Auto. Ass., Wash. D.C., 1948, p. 26.

Primary Examiner—Richard C. Pinkham
Assistant Examiner—MaryAnn Stoll
Attorney, Agent, or Firm—Willis E. Higgins

[57] ABSTRACT

A system (10) for the administration of driver's tests and similar standardized tests has a computer control unit (12). A cathode ray tube (CRT) or other display (14) is connected to the computer control unit (12) by line (15). The display (14) includes at least a numeric input keyboard (16) connected to the remainder of the display by line (17). A camera or other portrait image registering device (18) is connected to the computer control unit (12) by line (20). A fingerprint image registering device (22) is connected to the computer control unit (12) by line (24). At least the display (14), the portrait image registering device (18) and the fingerprint image registering device (22) are located in a booth (30) having a door (32). A switch or other detector (34) for an open door (32) prevents a test from being administered or continuing as long as the door (32) is open. A vision testing device (38) is connected to the computer control unit (12) by line (40). Both a test of knowledge of a state's driving laws and a vision test may be administered by this system.

7 Claims, 4 Drawing Figures

TESTING SYSTEM WITH TEST OF SUBJECT MATTERS, IDENTIFICATION AND SECURITY

BACKGROUND OF THE INVENTION

1. Field of the Invention

This invention relates to an electronic system for the administration of tests. More particularly, it relates to such a system which includes safeguards to prevent a person taking a test using the system from cheating and for preventing one person from taking the test for another person. Most especially, it relates to an electronic system for administering driver's license examinations.

2. Description of the Prior Art

Considerable manpower at the state government level is required for the conventional administration of driver's license examinations. For example, in the State of California, nearly one percent of the state's entire budget is required for this purpose. Administering and grading such tests on a manual basis is a labor-intensive operation. Due to manpower limitations and the large volume of applicants which must be examined, the conditions under which the tests are often given allows applicants to cheat on the examinations by sharing answers, consulting written materials, and the like. From the standpoint of the applicant, there are often long lines and other delays in the examination procedure, which are a source of irritation.

It is also known in the art to program various general purpose data processing systems for asking test questions and recording keyboard entered answers, particularly in a computer-assisted instruction environment. However, such use of data processing systems has not hitherto been considered of any value in solving the problems associated with the administration of driver's license examinations.

SUMMARY OF THE INVENTION

Accordingly, it is an object of this invention to reduce the amount of labor required in the administration of motor vehicle operator examinations and similar tests.

It is a further object of the invention to provide a system for administering a standardized test with safeguards against cheating.

It is a further object of the invention to provide such a system which incorporates positive identification of the person taking the test.

It is another object of the invention to provide such a system which makes taking such tests more convenient for an applicant.

It is still another object of the invention to provide such a system in which a standardized hearing and/or vision test is given in combination with a subject matter test.

The attainment of the foregoing and related objects may be achieved through use of the novel test administration system herein disclosed. The system comprises a data processing means for controlling operation of the system and presenting test questions to a person being examined. A display is connected to the data processing means for showing instructions and test questions to the person being examined. An input means is connected to the data processing means for the person being tested to respond to the instructions and the test questions. A means is connected to the data processing means for recording at least one personal characteristic unique to the person being tested, e.g., a physical or behavioral characteristic recording means, such as a fingerprint reader, signature recognition system, camera or similar means for recording an image of the person taking the test. For use in administering driving tests, the test administration system of this invention also desirably includes a vision and/or hearing testing means connected to the data processing means. The person being tested responds to a vision or hearing test presented by the vision or hearing testing means with the input means. In a preferred form of the invention, at least the display, input means and physical characteristic recording means are located in a booth with a door including means activated by closing the door for allowing initiation of a test, and for aborting the test if the door is opened before completion of the test.

In use of the test administration system of this invention, a predetermined quantity of questions selected randomly or on a similar basis from a larger set of questions is presented to the person being tested. The system safeguards isolate the person being tested from potential coaching sources during the examination. Use of such a system reduces the amount of labor involved in administering and scoring standardized tests, such as employed in driver's license examinations.

The attainment of the foregoing and related objects, advantages, and features of the invention should be more readily apparent to those skilled in the art after review of the following more detailed description of the invention, taken together with the drawings, in which:

DETAILED DESCRIPTION OF THE INVENTION

Figure 1:
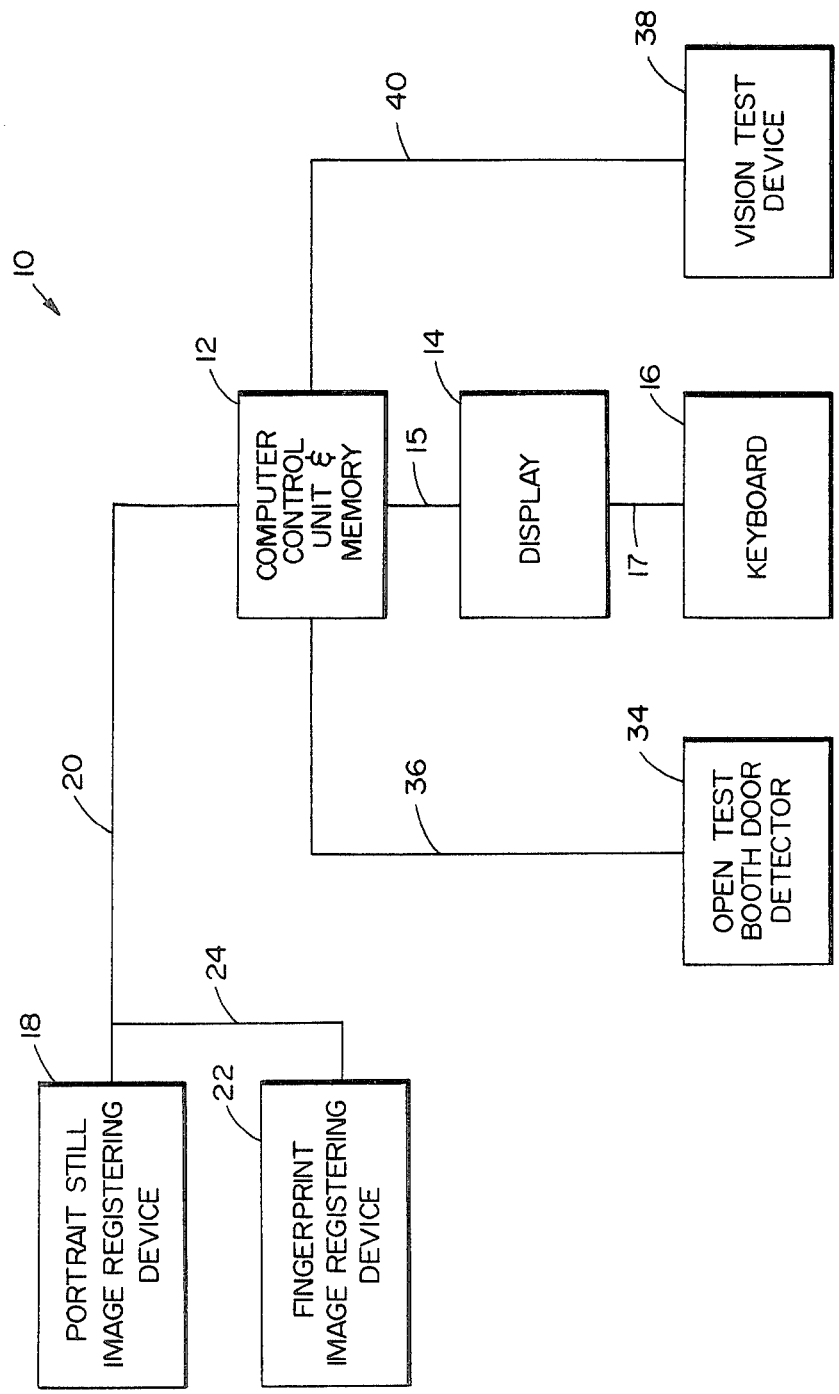
FIG. 1 is a block diagram of a test administration system in accordance with the invention.

Turning now to the drawings, more particularly to FIG. 1, there is shown a block diagram of a test administration system 10 in accordance with the invention. The system 10 includes a data processing unit 12, which includes the test to be administered in a memory, which may be either an on-line memory of the system or in a peripheral device, such as a disk drive. The system includes a program for administration of the test and incidental instructions to the person being tested and an operating control program for the system. A cathode ray tube (CRT), liquid crystal display (LCD) or light emitting diode (LED) display 14 is connected to the data processing unit 12 by line 15. A keyboard 16 is connected to the display 14 by line 17 and through display 14, to the data processing unit 12. A camera or other portrait still image registering device 18 is connected by line 20 to the data processing unit 12. In addition to a conventional photographic camera, a charge coupled device (CCD) camera or a video digitizer can be employed for this purpose. A fingerprint image registering device 22 is connected to the data processing unit 12 by lines 24 and 20. The fingerprint image registering device may be chemical in nature, photographic, a video digitizer, or the like.

Figure 2:
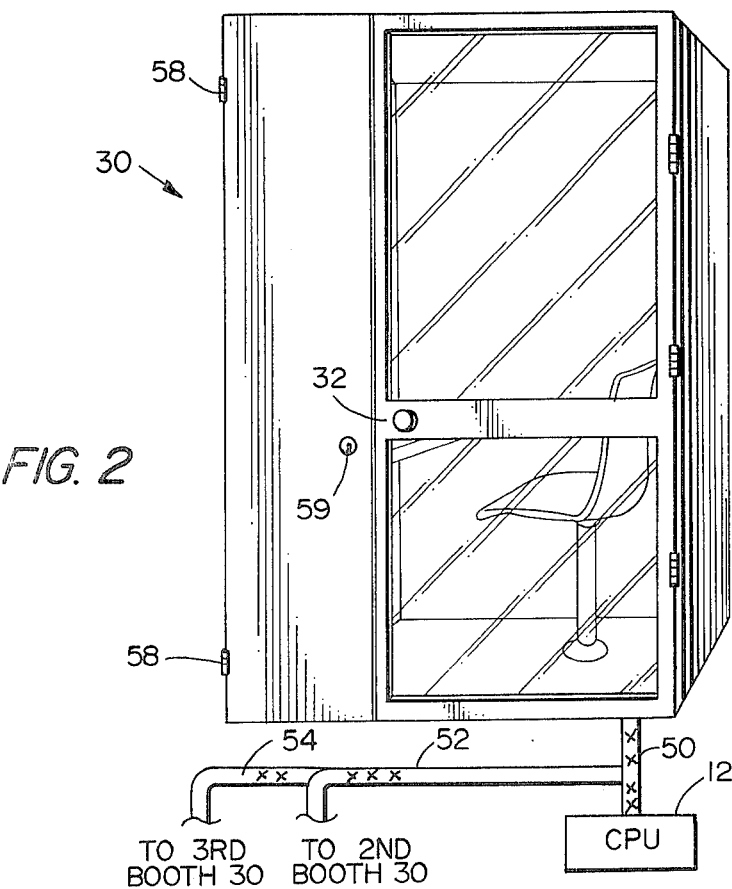
FIG. 2 is an external perspective view of a test administration system in accordance with the invention.

At least the display unit 14, input keyboard 16, portrait imaging device 18 and fingerprint image registering device 22 are contained within a booth 30, as shown in FIG. 2. The booth 30 has a door 32 and a switch or other open door detection means 34, which is connected by line 36 to the data processing unit 12. A vision testing device 38 is also connected to the data processing unit 12 by a line 40.

Figure 3:
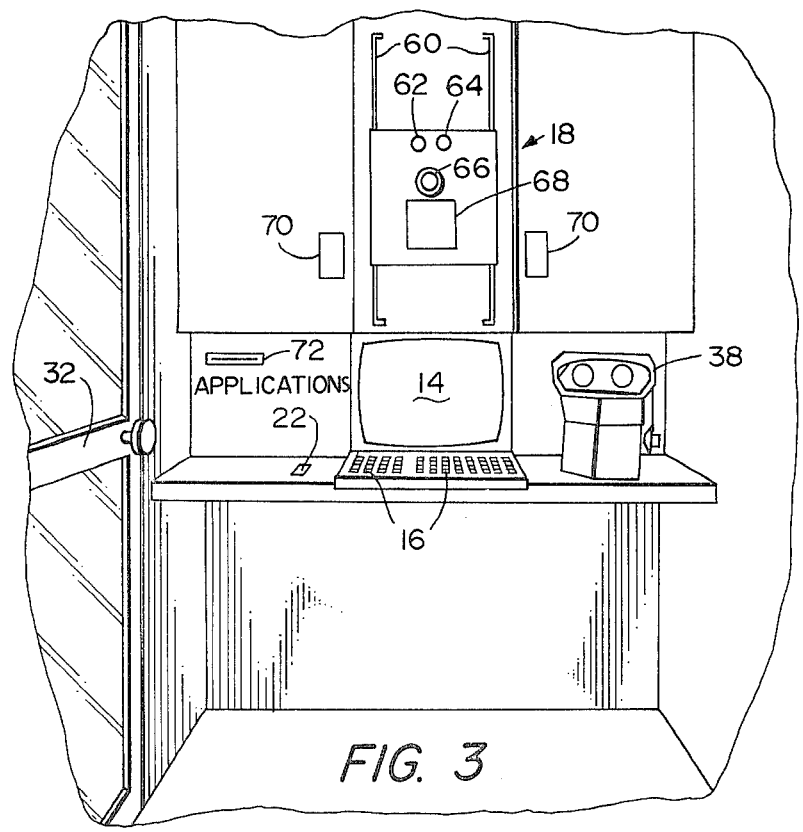
FIG. 3 is a perspective interior view of a portion of the system shown in FIG. 2.

Further details for implementing the system 10 of FIG. 1 are shown in FIGS. 2 and 3. As indicated in FIG. 2, several or more of the booths 30 can share a single data processing unit 12, connected to electronics for each booth 30 by means of cables 50, 52 and 54. Depending on the complexity of a test to be administered and the number of booths 30 to share a central data processing unit 12, the data processing unit 12 may be implemented with any commercially available 8 bit or 16 bit microcomputer, such as those available from Apple Computer Company, IBM Corporation, Tandy Corporation, or Texas Instruments. For a large number of booths 30, a larger minicomputer, such as a PDP-11, available from Digital Equipment Corporation, Maynard, Mass. may be used. Also, if an installation utilizing the test system of this invention has other data processing requirements, a larger data processing system could be time-shared for test administration and other data processing applications.

FIG. 3 shows details of the interior of one of the booths 30. The display 14 is shown as a CRT screen, and the keyboard 16 is shown as both a numeric key pad and an alphabetic keyboard. The portrait image registering device 18 is shown as a camera assembly mounted on rails 60 for height adjustment. An electric eye 62 and light 64 for the purpose of illuminating the applicant are positioned above camera lens 66 for carrying out the height adjustment. A convex mirror 68 is provided below the lens 66 for applicants to check their appearance before being photographed. Strobe lights 70 are provided on either side of the camera assembly 18 for illumination during the photograph. Camera assembly 18 can be implemented with any commercially available camera, but the use of a Polaroid ID-3 or similar system, modified for operation under control of data processing unit and obtainable from the Polaroid Corporation, Cambridge, Mass. is suitable. The vision testing device 38 is positioned to one side of the CRT display 14 and keyboard 16. The vision testing device 38 may be implemented with a Bausch & Lomb vision tester, commercially available from Bausch & Lomb Scientific Optical Products Division, Rochester, N.Y., but also modified for automatic operation under control of the data processing unit 12. The fingerprint image registering device 22 is provided on the other side of keyboard 16 from the vision tester 38. An application slot 72 is also provided to receive an application form from the person being tested. If desired, the application slot 72 may include a reader for obtaining information from the application form which has been coded by the applicant by a test administrator.

In operation, a person using the testing system of FIGS. 1-3 enters one of the booths 30 and closes the booth door 32 before beginning the examination. Instructions on the CRT display 14 guide the applicant through the procedure. If a coded, machine-readable application form is utilized, the preliminary procedures are simplified, since answers to such questions as which language the applicant desires to use for taking the examination may be coded on the form. Otherwise, such preliminary questions are asked on the CRT display, with answers being provided through keyboard 16. The detector 34 must indicate that the booth door 32 is closed before a test sequence may begin. If door 32 is opened at any time during the test sequence, the test will be aborted. After the preliminary matters have been completed, the data processing unit 12 presents a predetermined number of questions to the applicant on CRT display 14. For example, 35 questions could be randomly selected by the data processing unit 12 from an inventory of several hundred questions stored in memory of the system. An answer to each question is keyed in by the applicant with keyboard 16. The system may either provide an indication of any incorrect answers at the time they are keyed in, or give the overall results after the last question has been answered.

Assuming that the applicant has achieved a passing score on the examination on the state's driving laws, the eye test is then administered in a comparable manner. Either multiple choice numeric answers can be entered for the eye test through keyboard 16, or direct letter identification may be made with the alphabetic keyboard. Assuming that the applicant has passed both tests, the applicant will then be asked to indicate via the keyboard 16 when ready to have the photograph taken with the camera 18. Applicants would then be informed via display 14 when and how they will receive their licenses and how to have any questions they may have answered.

Figure 4:
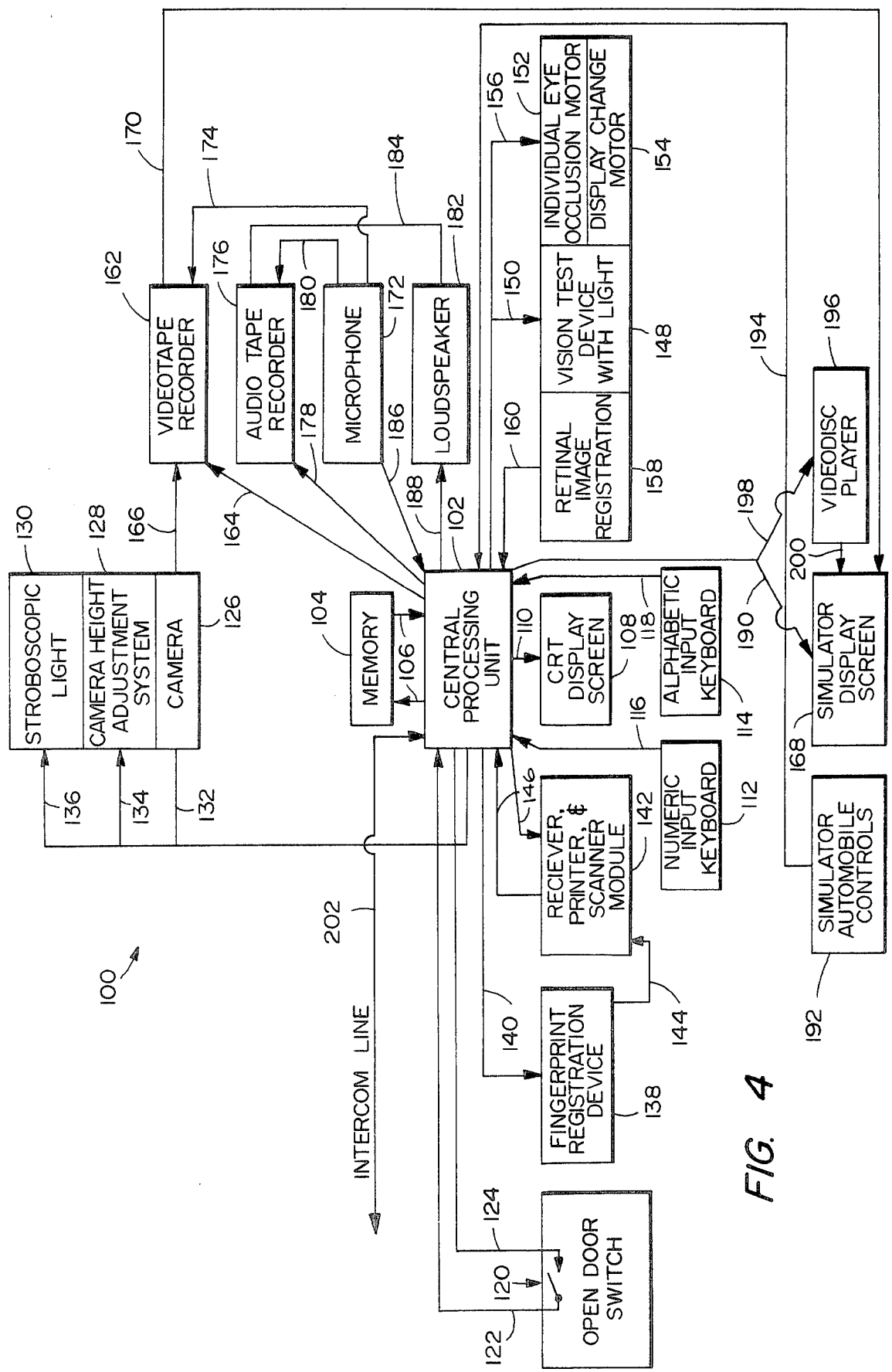
FIG. 4 is a block diagram of another embodiment of a test administration system in accordance with the invention.

FIG. 4 is a block diagram of a more comprehensive test examination system in accordance with the invention. A central processing unit 102 is connected to a memory 104 by lines 106. A CRT or other display screen 108 is connected to the CPU 102 by line 110. Numeric and alphabetic keyboards 112 and 114 respectively connected to CPU 102 by lines 116 and 118. A switch 120 activated by a door of a booth in which the system 100 is located is connected to the CPU 102 by lines 122 and 124. Camera 126, camera adjustment 128 and a stroboscopic light are connected to the CPU 102 by lines 132, 134 and 136. A fingerprint registration device 138 is connected to CPU 102 by line 140, and to a receiver, printer and scanner module 142 by line 144. The receiver, printer and scanner module 142 is connected to the CPU 102 by lines 146. Vision test device 148 is connected to the CPU 102 by lines 150. Eye occlusion motor 152 and display change motor 154 within the vision test device 148 are connected to the CPU 102 by line 156. A retinal image registration detector 158, also a part of the vision test device 148, is connected to the CPU 102 by line 160. A videotape recorder 162 is connected to CPU 102 by line 164, and to camera 126 by line 166. The videotape recorder 162 is also connected to a simulator display screen 168 by line 170, and to a microphone 172 by line 174. An audio tape recorder 176 is connected to the CPU 102 by line 178. The audio tape recorder is also connected to microphone 172 by line 180 and to a loudspeaker 182 by line 184. The microphone 172 and the loudspeaker 182 are each connected to the CPU by lines 186 and 188, respectively.

The simulator display screen 168. is connected to the CPU 102 by line 190. Simulator automobile controls 192 are connected to the CPU 102 by line 194. Videodisc player 196 is connected to the CPU 102 by line 198 and to the simulator display screen 168 by line 200. An intercom/data transmission line 202 is connected to the CPU 102.

In operation of the system of FIG. 4, the elements of FIG. 4 in common with the system of FIGS. 1-3 operate in the same manner. The module 142 acts as an interface for fingerprint information from the fingerprint registration device 138 between that device and the CPU 102. The CPU 102 acts as a switching device between intercom line 202, microphone 172 and loudspeaker 182 when the microphone 172 and loudspeaker 182 are used to communicate with another person outside booth 30, such as a test administrator. In addition to using the camera 126 to record an applicant's photograph, the connection by line 166 to videotape recorder 162 allows periodic images of the applicant to be recorded as an additional safeguard against cheating on the examination. The simulator display 168 and simulator controls 192 allow the test administration system to be used for a simulated driving test as well as a test on the state's driving laws. The simulator controls 192 provide signals to the CPU 102 based on manipulation of the controls by the applicant, as is conventional with such simulators. A suitable program is then used by the CPU 102 to evaluate the manipulations for determining whether the applicant's responses are appropriate. Situations can be displayed on the screen of display 168 from either the videodisc player 196 or the videotape recorder 162. Additionally, the videotape recorder 162 can be used to record an applicant's movements while carrying out the driving simulation test, for later evaluation in the event the simulated driving test is scored as a failure. The microphone 172 can also be used to detect characteristic high pitched noises generated by turning paper as a safeguard against cheating. The loudspeaker 182 may also be used with the audio tape recorder 176 and the CPU 102 for oral administration of a test to non-readers, either through a pre-recorded test sequence, or through speech synthesis circuits.

It should now be apparent to those skilled in the art that a novel test administration system capable of achieving the stated objects of the invention has been provided. The system administers a test of a state's driving laws on an automatic basis in a manner that incorporates positive identification of the applicant taking the test and incorporates other safeguards against cheating on the examination. As a result, use of the system of this invention will reduce the number of test administration personnel required for driving tests and similar examinations to be administered on a standardized basis to large numbers of people.

It should further be apparent to those skilled in the art that various changes in form and details of the invention as shown and described may be made. For example, other personal characteristics unique to the person being tested could be selected, such as retinal patterns, hand dimensions and the like. It is intended that such changes be included within the spirit and scope of the claims appended hereto.

What is claimed is:

1. A system for test administration comprising data processing means for controlling operation of the system and presenting the test to a person being tested, a display connected to said data processing means for showing instructions and test questions to the person being tested, input means connected to said data processing means for the person being tested to respond to the test questions, means connected to said data processing means for recording at least one personal physical body characteristic unique to the person being tested, said display, said input means, and said physical characteristic recording means being located in a booth having a door which will block entrance and exit from the booth when closed, said system further including means activated by closing the door for allowing initiation of the test, and for aborting the test if the door is opened before completion of the test, said booth having at least one transparent portion for allowing observation into said booth from outside said booth when the booth door is closed and a vision testing means in said booth connected to said data processing means, the person being tested responding to a vision test presented by said vision testing means with said input means.

2. The test administration system of claim 1 additionally comprising a hearing testing means in said booth connected to said data processing means, the person being tested responding to a hearing test presented by said hearing test means with said input means.

3. The test administration system of claim 1 in which said physical characteristic recording means comprises a fingerprint image registering device.

4. The test administration system of claim 1 in which said physical characteristic recording means is a portrait image registering device.

5. The test administration system of claim 4 in which said system additionally comprises means for activating the portrait image registering device at least periodically during administration of the test.

6. The test administration system of claim 1 additionally comprising, also in said booth, a simulator for an operation skill, controls operated by the person being tested in response to situations presented by said simulator, and means for evaluating the operation of said controls by the person being tested in response to the situations presented by said simulator.

7. The test administration system of claim 1 additionally comprising means in said booth for detecting noise generated by movement of paper.

* * * * *